United States Patent
Stoddart et al.

(10) Patent No.: US 10,140,772 B2
(45) Date of Patent: Nov. 27, 2018

(54) VISUALIZING ELECTROMAGNETIC PARTICLE EMISSIONS IN COMPUTER-GENERATED VIRTUAL ENVIRONMENTS

(71) Applicant: L-3 Communications Corp., New York, NY (US)

(72) Inventors: Nathan H. Stoddart, Farmington, UT (US); Adrian Musters, Roy, UT (US); Thomas R. Giallorenzi, Sandy, UT (US); Zachary D. Jenkins, Fruit Heights, UT (US); Joseph J. Booker, Draper, UT (US); Braden J. Bartlett, Tooele, UT (US); David R. Heath, Farmington, UT (US); Ashley M. Holt, Syracuse, UT (US); Michael D. Jackson, Sandy, UT (US); Jason C. Newbold, Herriman, UT (US); Dallin S. Pabst, Layton, UT (US); Jonathan C. Sanderson, Salt Lake City, UT (US); Benjamin I. Smart, Kaysville, UT (US); Lily Wang, Riverton, UT (US)

(73) Assignee: L3 Technologies, Inc., New York, NY (US)

( * ) Notice: Subject to any disclaimer, the term of this patent is extended or adjusted under 35 U.S.C. 154(b) by 77 days.

(21) Appl. No.: 15/268,195

(22) Filed: Sep. 16, 2016

(65) Prior Publication Data
US 2018/0082473 A1 Mar. 22, 2018

(51) Int. Cl.
G06T 19/00 (2011.01)
G06T 15/00 (2011.01)
G02B 27/01 (2006.01)

(52) U.S. Cl.
CPC ............ *G06T 19/006* (2013.01); *G02B 27/01* (2013.01); *G06T 15/005* (2013.01); *G02B 2027/0141* (2013.01)

(58) Field of Classification Search
None
See application file for complete search history.

(56) References Cited

U.S. PATENT DOCUMENTS

| | | | |
|---|---|---|---|
| 9,347,793 B2 * | 5/2016 | Meeker | G01C 23/00 |
| 2009/0084951 A1 * | 4/2009 | Boyden | G01N 23/223 250/307 |

(Continued)

*Primary Examiner* — Michelle Chin
(74) *Attorney, Agent, or Firm* — Workman Nydegger

(57) ABSTRACT

Embodiments are directed to visualizing electromagnetic (EM) particle emissions in a computer-generated virtual environment. In one scenario, a computer system accesses portions of data representing EM particle emissions emitted by a virtualized EM particle emitter. The computer system generates a particle visualization that includes at least a portion of the EM particle emissions being emitted from the virtualized EM particle emitter within the virtual environment. The particle visualization includes an indication of the EM particle emissions' interactions with other virtual or non-virtual elements in the virtual environment. The computer system then presents the generated particle visualization in the computer-generated virtual environment. In some cases, the computer system further receives user input intended to interact with virtual elements within the virtual environment. In response, the computer system updates the generated particle visualization based on the user's interaction with the virtual element.

20 Claims, 7 Drawing Sheets

(56) References Cited

U.S. PATENT DOCUMENTS

| | | | | |
|---|---|---|---|---|
| 2012/0309415 A1* | 12/2012 | Rhoads | ................ | G01S 5/0273 455/456.1 |
| 2016/0187654 A1* | 6/2016 | Border | .................... | G02B 5/04 359/567 |

* cited by examiner

VISUALIZING ELECTROMAGNETIC PARTICLE EMISSIONS IN COMPUTER-GENERATED VIRTUAL ENVIRONMENTS

BACKGROUND

Today's computing systems can be used to perform a variety of functions, including providing different computer-generated virtual environments. These computer-generated virtual environments refer to any type of virtual reality environments, augmented reality environments, mixed reality environments or other similar systems that attempt to modify or replace one's perception of his or her surroundings. In the case of augmented or mixed reality systems, viewers wear glasses, headsets, or other displays that allow the user to view their normal, physical surroundings, while having virtual content projected onto those physical surroundings. As a result, the user might have a blank wall in real life, while the augmented reality system displays a screen, a picture or other virtual item on that wall. In some systems, users may be able to interact with the virtual items using gestures, vocal commands, game controllers or other interfaces.

In virtual reality systems, users implement a full headset that blocks the user's view of all real life physical objects. As such, the user is completely immersed in a virtual world that is provided entirely by the computer system. Similar to augmented reality systems, users in virtual reality systems may interact with virtual elements in the virtual environment using various input methods.

BRIEF SUMMARY

Embodiments described herein are directed to visualizing electromagnetic (EM) particle emissions in a computer-generated virtual environment. In one embodiment, a computer system accesses portions of data representing EM particle emissions emitted by a virtualized EM particle emitter. The computer system generates a particle visualization that includes at least a portion of the EM particle emissions being emitted from the virtualized EM particle emitter within the virtual environment. The particle visualization includes an indication of the EM particle emissions' interactions with other virtual or non-virtual elements in the virtual environment. The computer system then presents the generated particle visualization in the computer-generated virtual environment.

In another embodiment, a computer system accesses data representing EM particle emissions emitted by a virtualized EM particle emitter, and generates a particle visualization of the EM particle emissions being emitted from the virtualized EM particle emitter within the virtual environment, where the particle visualization includes an indication of the EM particle emissions' interactions with other elements in the virtual environment. The computer system then presents the generated particle visualization in the computer-generated virtual environment and receives user input intended to interact with virtual elements within the virtual environment. In response, the computer system updates the generated particle visualization based on the user's interaction with the virtual element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
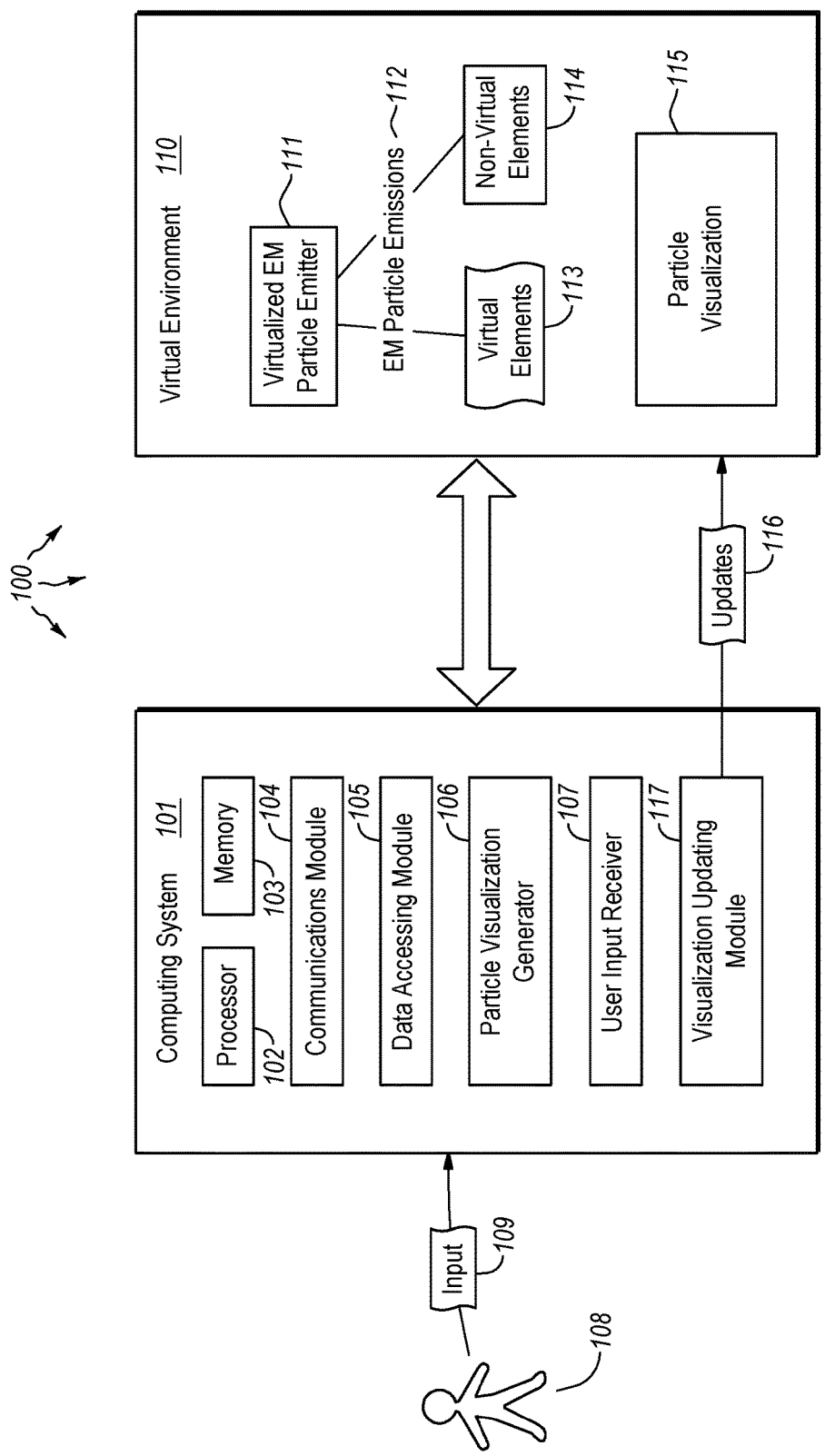
FIG. 1 illustrates a computer architecture in which embodiments described herein may operate including visualizing electromagnetic (EM) particle emissions in a computer-generated virtual environment.

Embodiments described herein are directed to visualizing electromagnetic (EM) particle emissions in a computer-generated virtual environment. In one embodiment, a computer system accesses portions of data representing EM particle emissions emitted by a virtualized EM particle emitter. The computer system generates a particle visualization that includes at least a portion of the EM particle emissions being emitted from the virtualized EM particle emitter within the virtual environment. The particle visualization includes an indication of the EM particle emissions' interactions with other virtual or non-virtual elements in the virtual environment. The computer system then presents the generated particle visualization in the computer-generated virtual environment.

In another embodiment, a computer system accesses data representing EM particle emissions emitted by a virtualized EM particle emitter, and generates a particle visualization of the EM particle emissions being emitted from the virtualized EM particle emitter within the virtual environment, where the particle visualization includes an indication of the EM particle emissions' interactions with other elements in the virtual environment. The computer system then presents the generated particle visualization in the computer-generated virtual environment and receives user input intended to interact with virtual elements within the virtual environment. In response, the computer system updates the generated particle visualization based on the user's interaction with the virtual element.

The following discussion refers to a number of methods and method acts that may be performed by one or more embodiments of the subject matter disclosed herein. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring to the figures, FIG. 1 illustrates a computer architecture 100 in which at least one embodiment described herein may be employed. The computer architecture 100 includes a computing system 101 with a hardware processor 102 and hardware memory 103. The computing system 101 may be any type of local or distributed computing system, including a cloud computing system. The computing system 101 includes modules for performing a variety of different functions. For instance, the communications module 104 may be configured to communicate with other computing systems. The communications module 104 may include any wired or wireless communication means including a receiver that can receive data and/or a transmitter that can transmit data to or from other computing systems. The communications module 104 may be configured to interact with databases, mobile computing devices (such as mobile phones or tablets), embedded or other types of computing systems.

The computer system 101 may be configured to generate virtual environments such as virtual environment 110. As used herein, the term "virtual environment" refers to any type of virtual reality, mixed reality, augmented reality or other virtualized environments in which some or all of the visible elements are computer-generated. As mentioned above, virtual reality environments are entirely computer-generated. In such environments, users typically put on a full headset that blocks the user's view of all real life physical objects. When the user is wearing the virtual reality (VR) headset, the user is completely immersed in a virtual world that is generated entirely by the computer system 101. Users may interact with virtual elements in the virtual environment using various input methods including gestures, vocal commands, game controllers or other interfaces.

In the case of augmented or mixed reality systems, viewers typically wear glasses, headsets, or other displays that allow the user to view their current physical surroundings, while having virtual, computer-generated content projected onto those physical surroundings. These glasses or headsets may allow the user to view a kitchen with physical countertops, cupboards and a table, while also viewing a virtual shopping list projected onto the refrigerator, a virtual recipe projected onto one of the countertops, and a virtual television on the wall displaying visual content. As with VR systems, users may be able to interact with the virtual items using gestures, vocal commands, styluses, game controllers or other interfaces. Accordingly, the virtual environment 110 may be any such virtualized environment, and may be changed by one or more computer users (e.g. 108) to add or remove virtual content using input 109.

The virtual environment 110 may include a virtualized electromagnetic (EM) particle emitter 111. The virtualized EM particle emitter may be any type of EM source including an antenna, radio, transmitter or other device capable of receiving or transmitting EM communication signals. In the virtual environment 110, the virtualized EM particle emitter produces EM emissions 112 that are visualized as particles. Indeed, each photon that is emitted from the virtualized EM particle emitter may be represented using a virtual particle. Each particle may represent one or more photons. Thus, in some cases, the virtual environment 110 may illustrate a higher photon-to-particle ratio in which many photons are associated with (or are aggregated into) one particle. Alternatively, the virtual environment 110 may illustrate a lower photon-to-particle ratio in which fewer (or even one) photons are associated with one particle. This ratio may be configured by the user 108 according to which visualization makes the most sense to the user.

Figure 2:
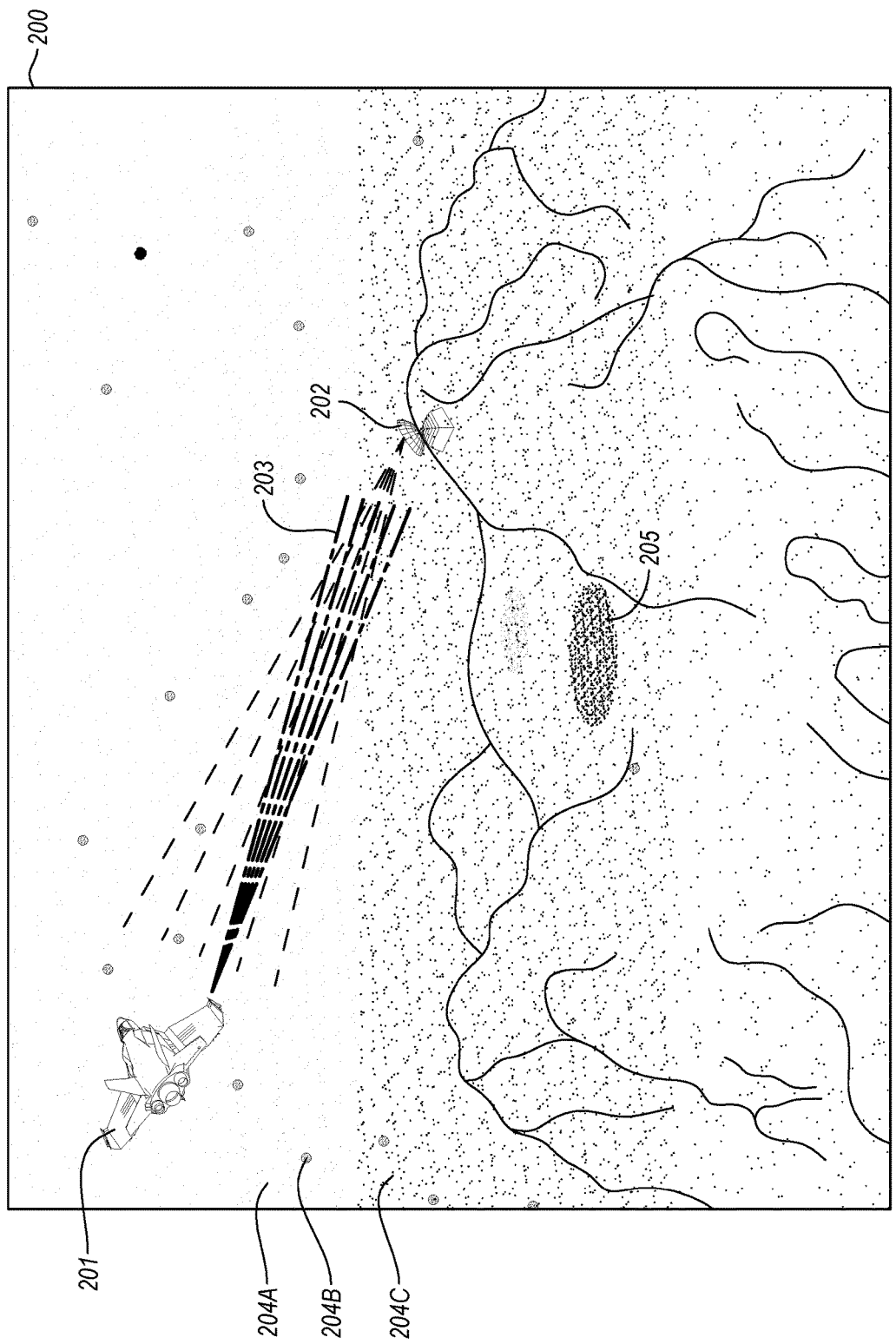
FIG. 2 illustrates a snapshot of a computer-generated virtual environment in which an aircraft and an EM particle emitter are emitting and receiving EM particle emissions.

The EM particle emissions 112 produced by the virtualized EM particle emitter 111 may interact with other virtual and non-virtual elements within the virtual environment 110. For example, the EM particle emissions 112 may interact with an airplane, as shown in FIG. 2. The EM particle emissions 203 of FIG. 2 may interact with airplane 201. The EM particle emissions 203 are emitted by virtualized EM particle emitters such as 202 and 205, which are illustrated as being located in different parts of a mountainous environment. The airplane itself may also be a particle emitter.

The visualization 200 of FIG. 2 illustrates what one embodiment of virtualized emitters and their interaction with virtual elements (113) may look like. The visualization 200 may have different types of emitters, each of which may emit different types of EM particle emissions 203. For example, as indicated by the various sizes of particles 204A, 204B and 204C, each illustrated particle may be of a different size or color, and that size or color may correspond with the respective emitter. As such, the user would see many different particles flowing from an emitter, radiating outward in a pattern. FIG. 2 illustrates one moment in time in a continuously generated, interactive environment. The visualization 200 may include many different depictions of EM particle emissions, in addition to or as alternatives to particle color and size.

In mixed or augmented reality environments, the EM particle emissions may interact with non-virtual elements 114 that are physically present in the user's current environment. Embodiments such as that shown in FIG. 2 are referred to herein as anti-access/area denial (A2AD) environments. The virtual environment 110 of FIG. 1 may be used to visualize many different embodiments, and in particular, visualizing the electromagnetic spectrum using particles for battlefield management, planning, flight test observation/playback and simulation in A2AD environments. Such embodiments allow multiple users to experience both the visible physical battlefield as well as the invisible battlefield from different perspectives simultaneously. Indeed, a plurality of users may be able to view the virtual environment 110 at the same time, and interact therewith. This can increase situational awareness and comprehension of the electromagnetic spectrum in A2AD environments, and can thus facilitate more efficient decision-making in battlefield management, planning, and simulation.

Sharing the virtual environment 110 among a plurality of users allows for improved and more natural understanding of EM emissions and communications. As these emissions (with the exception of visible light) cannot be seen, the virtual environment helps facilitate the creation of a mental model around how EM sources emit radiation, how that radiation travels, what the physical limits of each EM source are (i.e. how far the photons travel before becoming attenuated and dispersed). Each user is given a specific context within the virtual environment 110. Different users can view the same data from various perspectives within their context, depending on individual goals and needs. In some cases, such as in A2AD environments, data can be viewed as a team, with teammates keeping an eye on different aspects of the battlefield, while communicating information that needs to be coordinated.

The virtual environment 110 may be configured to display the virtualized EM particle emitter(s) 111, along with the EM particle emissions 112 and their interactions with surrounding virtual elements 113 and non-virtual elements 114, in two dimensions or in three dimensions. At least in some embodiments, 3-D representations are used to represent the many complexities of the EM spectrum. Navigating through three dimensions is difficult on a 2D display, especially when using a keyboard and mouse. When the virtual environment 110 is provided in a virtual, mixed or augmented reality system, the virtual environment provides presence for the user—the feeling that the user is actually in the environment, and that the elements displayed in the environment are real. This provides a natural way to navigate and interpret A2AD information or other types of information, while allowing interaction with the environment using various input tools. The experience is thus in a context that is more familiar and natural to people trying to comprehend and navigate the information presented, which may afford quicker and better decision-making.

As mentioned above, the embodiments described herein use particles to represent EM emissions. As shown in FIG. 2, particles in the air and flowing from one communication device to another allow a user to visualize the electromagnetic spectrum. This visualization better matches the mental model of how people think about A2AD battlefields or other environments. The illustrated particles provide a physics-accurate abstraction of the photons of RF energy in the electromagnetic spectrum. As such, the particle-based system affords a more robust visualization of the complex motion of photons, and conveys more information than traditional shape and color representations, especially 2D versions of such. This visualization or mental model is even more accurate when rendered in a 3D experience, permitting users to explore and comprehend the physics of what's actually happening in an environment.

When simulating an A2AD battlefield, there may be situations where an exocentric frame of reference would be preferable (e.g. projecting the visualization on a table), while in other situations, an ego-centric frame of reference may be preferable (e.g. an immersive experience where the visualization is all around the observer). Augmented and mixed reality systems permit this flexibility. This is advantageous over virtual reality systems which are strictly ego-centric, as well as being advantageous over 2D displays which are strictly exocentric. These concepts will be explained further below with regard to FIGS. 3-7.

Figure 3:
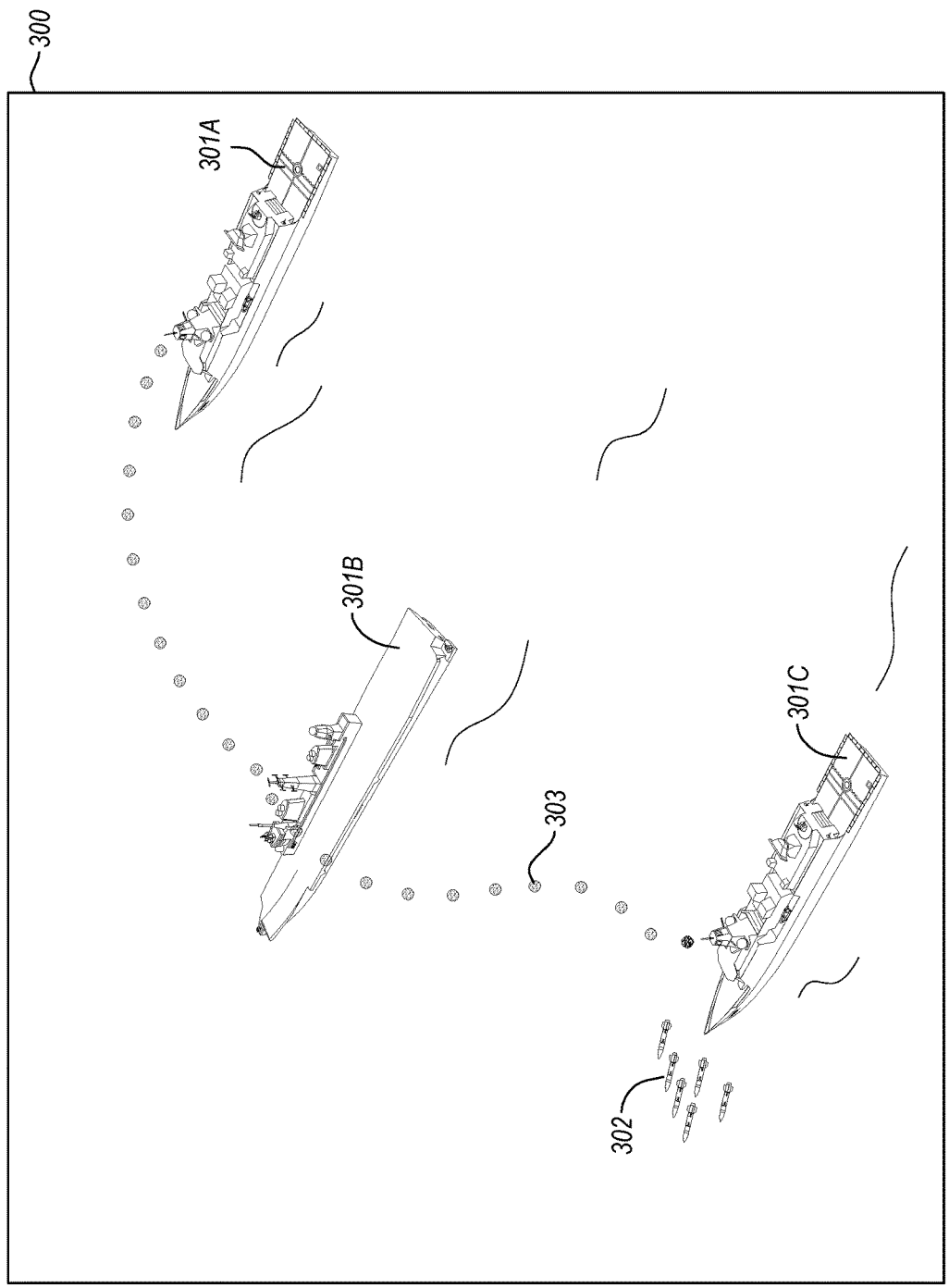
FIG. 3 illustrates a snapshot of a computer-generated virtual environment in which watercraft are emitting and receiving EM particle emissions.

FIG. 3 illustrates a computer-generated virtual environment 300 in which electromagnetic signals are transmitted and received by transceivers on various watercraft 301A, 301B and 301C. The electromagnetic signals may be any type of EM signal, along any frequency or bandwidth. Moreover, while three EM sources and receivers are shown in FIG. 3, it will be understood that EM emissions may be generated and propagated by a variety of different sources including cell phones, cell phone towers, drones, satellites, aircraft, submersible watercraft or substantially any device that has an antenna and electronic hardware and/or software operable to transmit or receive signals through the antenna.

In FIG. 3, watercraft 301A is transmitting signals 303 and/or data to watercraft 301B, which itself is exchanging EM signals with watercraft 301C. In FIG. 3, watercraft 301C is also shown as having launched missiles 302. Each of these missiles may include an antenna, which receives and transmits signals to the other watercraft (or to other devices). The EM signals in the computer-generated virtual environment 300 are visualized as particles 303. In some cases, each particle represents an individual photon emitted from an EM source. The particle is illustrated as flowing from an EM source to an EM receiver. In most cases, the particle will be illustrated as traveling at sub-light speed (or substantially sub-light speed) so that the travel path is more easily understood by the observer.

Indeed, the snapshot shown in FIG. 3 illustrates just one moment in time in a continuously evolving environment. Various features within the computer-generated virtual environment 300 may be highlighted, or selected by a user. Such elements may be zoomed in on so as to increase visibility of the element. The flow of EM radiation continues to run as certain elements are selected for observation. In cases where the computer-generated virtual environment 300 is a 3D environment and the observer's perspective is changing, the particles 303 used to represent the EM emissions change from the observer's point of view. Thus, if an observer's view is initially from a high vantage point, such as in FIG. 3, and the user lowers the view to a water-level view, the particles 303 transmitted from ship to ship will be illustrated as being above the observer. As shown in virtual environment 400 of FIG. 4, the watercraft 301A-C are now in a different position, and the missiles 302 have now moved closer to their targets.

Different kinds of signals or different kinds of data may be represented by different shapes, sizes or colors of particles. Thus, cellular voice traffic may be illustrated as one color (e.g. blue), and inter-ship communications may be illustrated in another color (e.g. red). Other symbols or other identifiers may be used to distinguish the particles from each other. For instance, particles from a satellite may be illustrated as square dots, while inter-ship communications are illustrated as round dots. In an anti-access/area denial (A2AD) environment, enemy EM emissions may be illustrated in one manner, while allies' emissions may be illustrated in another manner. Thus, within the computer-generated virtual environment 300, observers may readily see which items are radiating EM emissions, and which are friendly or foe.

The computer system 101 of FIG. 1 may be used in such an A2AD environment. The computer system 101 has a processor 102 and a data accessing module 105 configured to access data representing EM particle emissions emitted by virtual EM particle emitters in a virtualized A2AD environment. These virtual EM particle emitters may be the receivers and antennas on the watercraft 301A, 301B and 301C in the computer-generated virtual environment 300 of FIG. 3.

In some cases, the A2AD environment 300 is intended to be an approximation or replica of a real-life physical location. In such cases, watercraft and aircraft can use the computer-generated virtual environment 300 to get an idea of where enemy transmitters or receivers (e.g. detectors) are located, and how far each is capable of transmitting. The particles 303 emitted from these transceivers may be visualized by the observer in an immersive 3D virtual environment. In the case of an airplane pilot, the pilot may use the virtual environment 300 to plan a flight path that avoids detection by a detector, or that flies within a specified distance of a device with which the airplane needs to communicate.

The computer system 101 of FIG. 1 may also include a particle visualization generator 106 that is configured to generate a particle visualization 115 of EM particle emissions 112 being emitted from the virtual EM particle emitters 111 in the virtual A2AD environment 110 (or 300 of FIG. 3). The particle visualization may include an indication of the EM particle emissions' interaction with other elements in the virtual A2AD environment, including virtual elements 113 and non-virtual elements 114. In a mixed- or augmented-reality environment, the non-virtual elements 114 may include real-life items that are in the same room or same environment as the user 108. The virtual elements 113 may include those elements that are computer-generated within the environment 110.

The computer system 101 may also include or be communicatively linked to a display for displaying the generated particle visualization 115 in the computer-generated virtual environment 110. An input receiver 107 may receive user input 109 intended to interact with virtual elements 113 within the virtual A2AD environment 110, and a visualization updating module 117 may be used to update the generated particle visualization 115 based on the user's interaction with the at least one virtual element. The user 108 may, for example, change the perspective of the virtual environment to rotate around an object, zoom in on an object, zoom out from an object or select a specific flow of particles to follow. The user may also move objects, replace objects, add objects or otherwise change the virtual environment. In each case, the visualization updating module 117 may track the user's input and interactions with the environment 110, and may alter and update the environment accordingly.

In the case of an A2AD environment, the particle visualization generator 106 may be further configured to provide additional functionality in the particle visualization including battlefield management, planning, flight test observation, playback and simulation in the virtual A2AD environment. Indeed, the particle visualization generator 106 may be customized for certain applications or environments, such as A2AD environments. This customization may include providing highly specialized features including battlefield management, flight test observation, determining potential interference between aircraft, interference caused by geography, interference caused by weather, etc. Other specialized virtual environments may also be provided by the computer system 101, and may be modified by the user 108.

Figure 5:
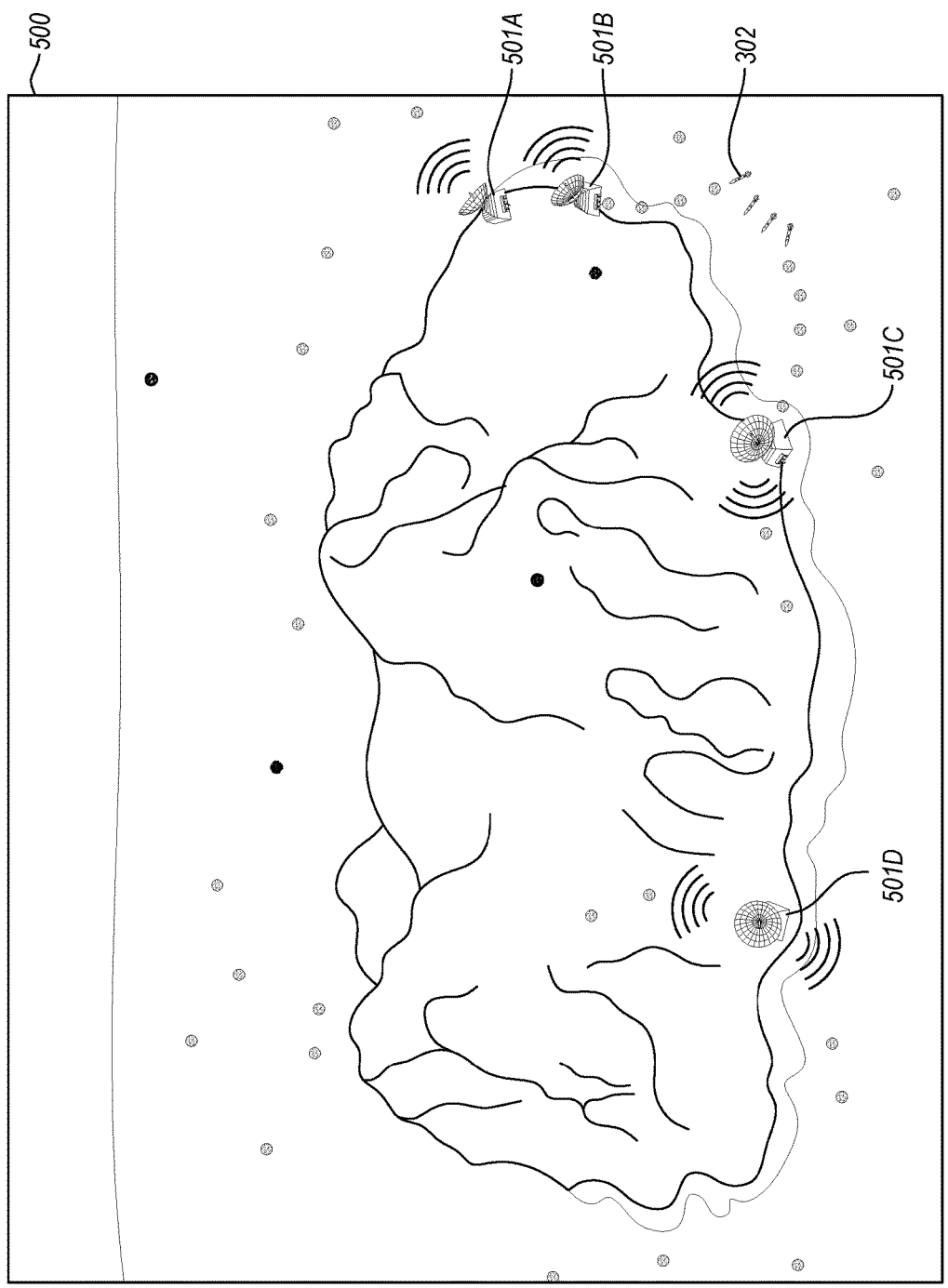
FIG. 5 illustrates a snapshot of a computer-generated virtual environment in which missiles and multiple ground-based EM particle emitters are emitting and receiving EM particle emissions.

In one A2AD embodiment, such as virtual environment 500 of FIG. 5, the particle visualization generator 115 may be configured to instantiate signal jammers or other EM sources 501A-501D within the virtual A2AD environment 500. Particles are shown as being emitted from the various EM sources 501A-501D, as well as from the missiles 302, which are also EM sources. Other particles are also shown in FIG. 5, representing EM emissions from satellites, airplanes, drones or other EM sources. As mentioned above, each EM signal source may be color coded with its own colored particles. This may make it easier to determine the source for each particle. Still further, the color coding may make it easier to see how far a given signal is transmitted before being attenuated and losing its signal strength.

The particle visualization generator 106 may be configured to identify each EM source, determine what device is making the transmissions, and determine various characteristics including signal strength, signal direction, frequency, bandwidth, data type or other characteristics. Then, based on these determined characteristics, the particle visualization generator 106 may determine how many photons are emitted by each EM signal source 501A-501D (e.g. from each signal jammer or other source), and at what rate and signal strength. It may then determine how best to represent those photons as particles, including determining speed, heading, coloring, size, shape, etc. The generated particles may then be illustrated as a continuously flowing stream of particles out of a given EM source.

Cell phone users could use such an environment to determine where to best achieve cell phone coverage, while airplane pilots in an A2AD scenario could use the environment to determine which flight course results in a minimal amount of particles coming into contact with their aircraft, or to map out a flight course through the virtual A2AD environment that avoids signal jammers. Watercraft 301A-C, such as those shown in virtual environment 600 of FIG. 6, may use the virtual stream of particles 303 to identify how close they can come to shore without being detected or without their signals being jammed by jammers. One skilled in the art will recognize that there are many different potential applications for the computer system and virtual environments described herein, where photons generated by an EM source are represented by particles in a computer-generated virtual environment. This will be discussed further below with regard to method 700 of FIG. 7.

Figure 7:
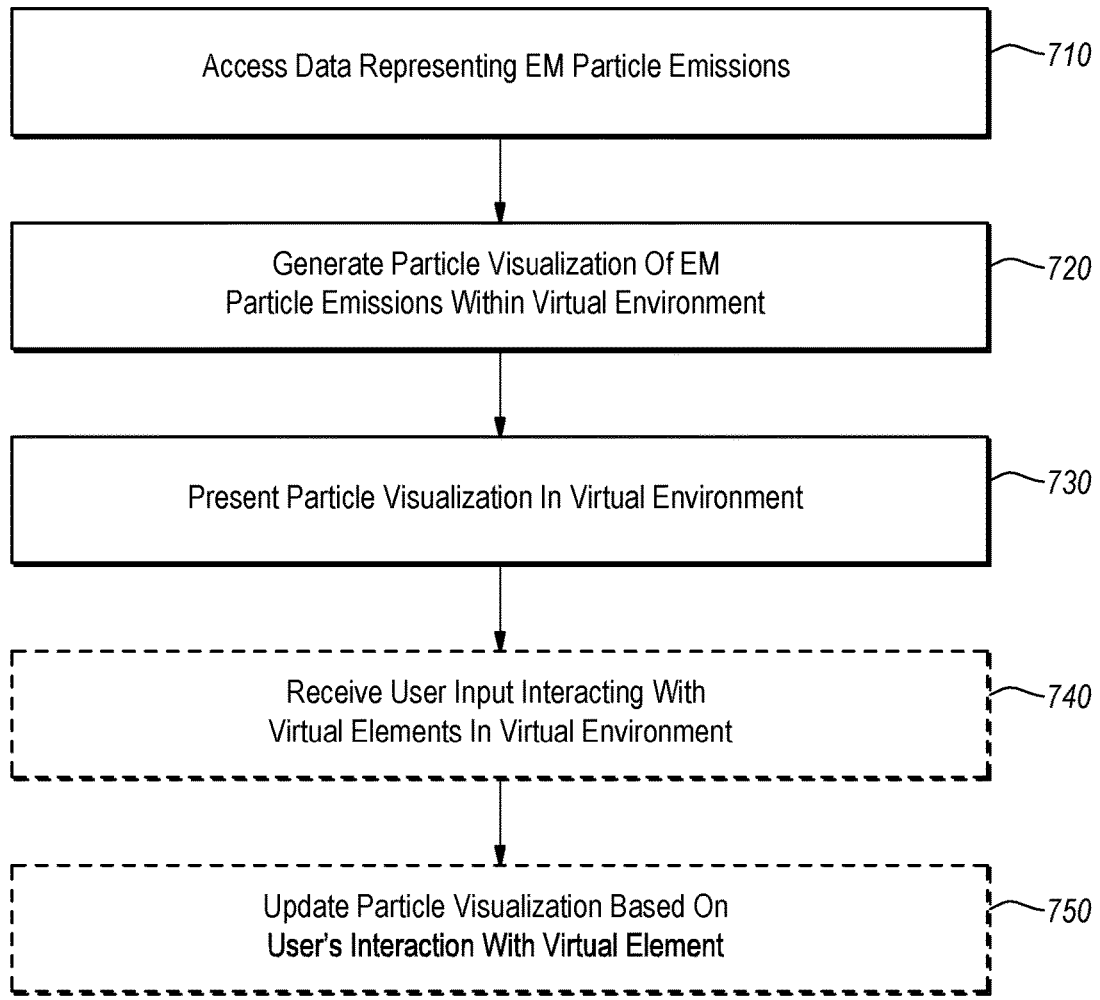
FIG. 7 illustrates a flowchart of an example method for visualizing electromagnetic particle emissions in a computer-generated virtual environment, and allowing interactions therewith.

In view of the systems and architectures described above, methodologies that may be implemented in accordance with the disclosed subject matter will be better appreciated with reference to the flow charts of FIG. 7. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 7 illustrates a flowchart of a method for visualizing electromagnetic (EM) particle emissions in a computer-generated virtual environment. The method 700 will now be described with frequent reference to the components and data of virtual environment 100 of FIG. 1.

Method 700 includes accessing one or more portions of data representing EM particle emissions emitted by at least one virtualized EM particle emitter (710). For example, the data accessing module 105 of computer system 101 may access data representing EM particle emissions 112 emitted by virtualized EM particle emitters 111. The virtualized emitters 111 may emit EM radiation at different frequencies and at different strengths. Accordingly, the data representing these EM emissions may be taken into account by the particle visualization generator 106 which actually generates the particles representing photons in the particle visualization 115.

The particle visualization generator 106 generates a particle visualization 115 of the EM particle emissions 112 being emitted from the virtualized EM particle emitter 111 within the virtual environment 110 (720). The particle visualization 115 includes an indication of the EM particle emissions' interactions with other (virtual 113 or non-virtual 114) elements in the virtual environment 110. The particle visualization may represent the photons emitted by the emitters in a variety of different ways. In some cases, each photon may be represented by a single particle; in other cases, groups of photons may be aggregated together and represented by a single particle. The ratio of photons to particles may be increased or decreased by the user 108, according to the user's preference. These particles represent the photons emitted in a given environment and, as such, the particle visualization 115 represents the physics of the environment.

Within the representation, various physical factors may be taken into consideration including weather which may more heavily attenuate a signal, or other elements in the environment which may reflect, refract or impede signals. In some cases, the EM particle emitters 112 may be mobile, while in other cases they are stationary. As such, the transmission characteristics related to the EM particle emitters 112 may change over time based on weather, based on moving positions, or based on other factors.

Method 700 also includes presenting the generated particle visualization in the computer-generated virtual environment (730). Once generated by the particle visualization generator 106, the particle visualization 115 is presented to the user 108 or to a group of users. The particle visualization 115 may be presented in a virtual reality environment, in an augmented reality environment, or in a mixed reality environment. Additionally or alternatively, the particle visualization 115 may be presented in 2D or 3D on a computer monitor, on a projector, or via some other display means. Each environment may require different hardware or other elements.

For instance, the virtual reality environment may require the user 108 to wear a mask or other type of eyepiece that covers the user's eyes and envelops the user in a fully computer-generated virtual world. In the virtual reality environment, the particle visualization 115 may be shown in a virtual environment such as environment 200 of FIG. 2 or environment 300 of FIG. 3. The environment may include multiple EM emitters (e.g. 201, 202, 301A-C, etc.), and various natural or other elements with which the signals (shown as particles) interact.

In an augmented reality environment or mixed reality environment, a user may wear glasses or other eyepieces that are semi-transparent or fully transparent. Such eyewear would allow the user to see his or her current physical environment, along with virtual elements such as the particle visualization 115. Within the augmented or mixed reality environments, particles may be used to represent physical radiative emissions from devices. These particles could be shown as coming from real-life objects such as cell phones or car antennas or airplane transmitters. The particles may thus show which devices in the real, physical environment are emitting photons, and may illustrate the particles as coming from those sources.

In some cases, the generated particle visualization 115 may be implanted in a heads up display. A heads up display (HUD) may be a form of a mixed or augmented reality environment where a pilot or other user is viewing his or her physical external surroundings, while having images such as particle visualization 115 projected onto the HUD. These images may help the pilot or other user to navigate his or her airplane and, more specifically, navigate the plane away from or toward certain EM emitters.

The particle visualization 115 may be presented to a single user or to a plurality of users, such as a group of people in the same physical room. The users in such cases may simultaneously experience the particle visualization 115, where each user experiences the visualization from his or her own perspective. Thus, for example, in a virtual reality environment, the group of users may see the watercraft 301A-D of FIG. 3 and may see the flow of particles (i.e. the flow of EM emissions) from one watercraft to another. Some users may see the watercraft from above, while others may be at water level or even below water level. Users may change their view as desired. As the users' views are changed, particles continue to flow, and new particles may come into view or fade from view as signal strengths increase or decrease relative to the user's distance from an EM particle emitter 111.

Figure 4:
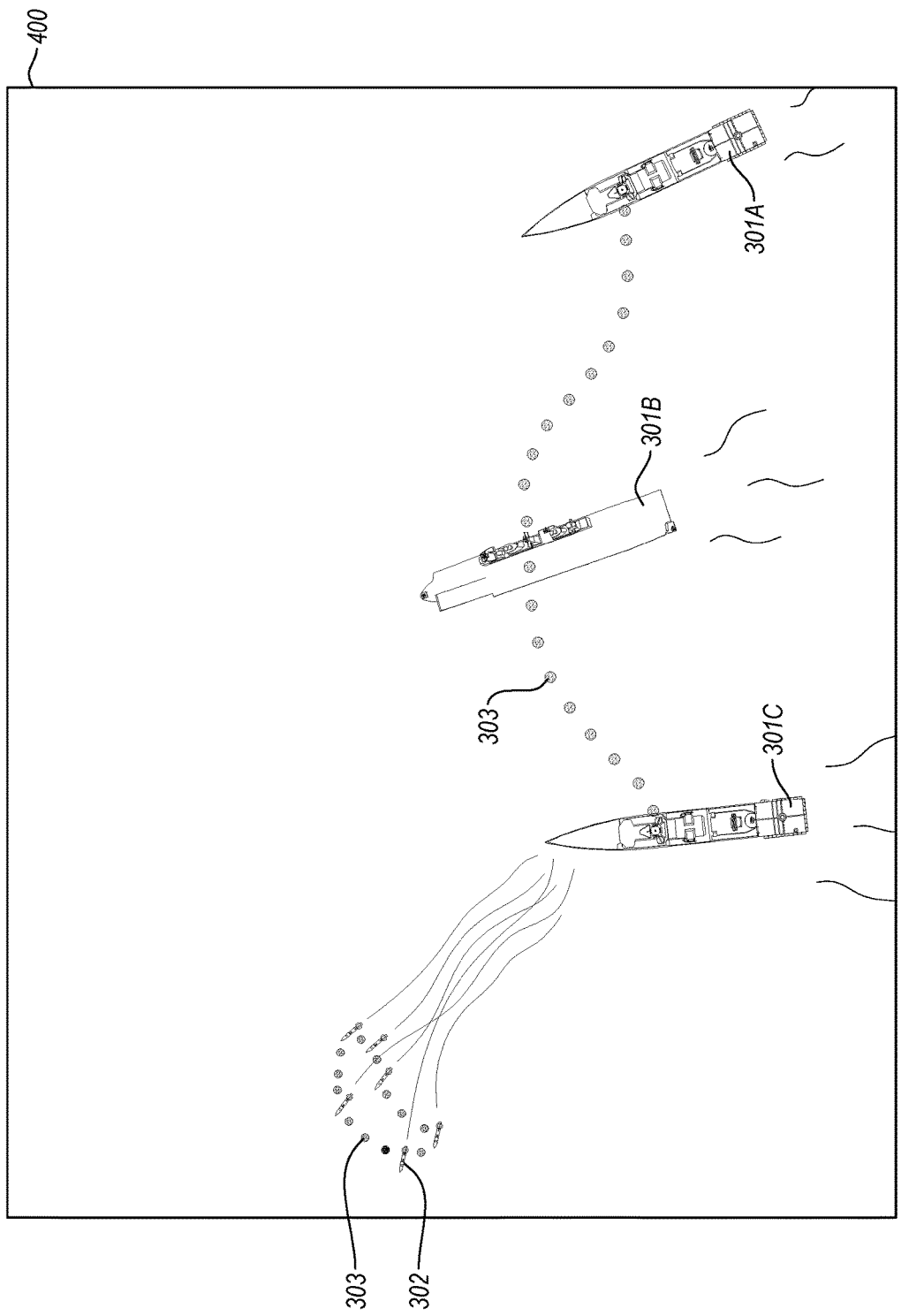
FIG. 4 illustrates a snapshot of a computer-generated virtual environment in which watercraft and missiles are emitting and receiving EM particle emissions.
Figure 6:
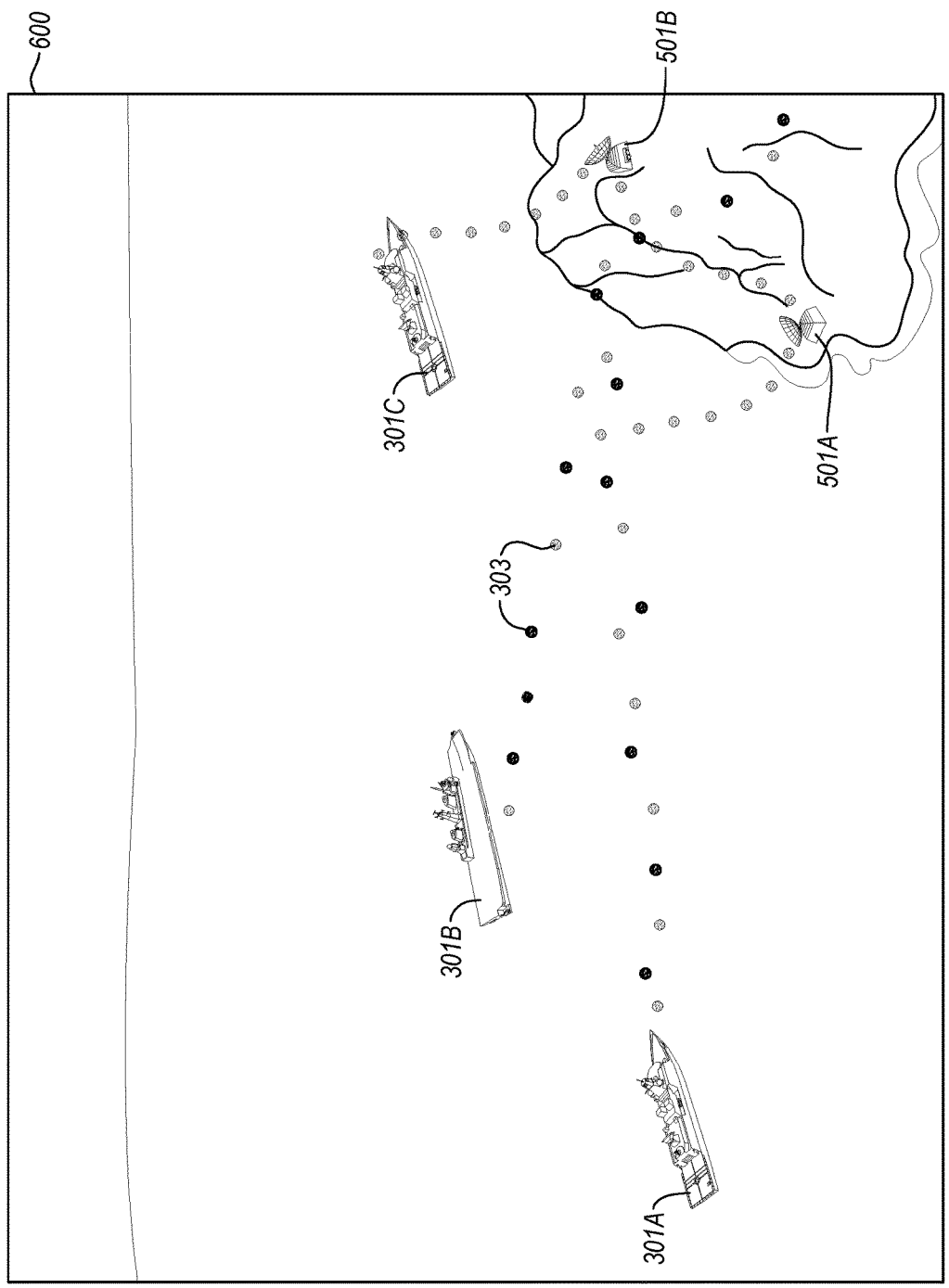
FIG. 6 illustrates a snapshot of a computer-generated virtual environment in which watercraft and multiple ground-based EM particle emitters are emitting and receiving EM particle emissions.

In one example, the generated particle visualization 115 includes a visible replication of a physical battlefield (e.g. FIGS. 4-6). The physical battlefield may include the physical aircraft, ships, communications devices, landscape, weather and other elements. The replication of the physical battlefield may also include a virtual replication of an invisible battlefield including EM particle emission from variously-placed EM particle generators. Many users may view the same battlefield at the same time, each from his or her own perspective. These users may also interact with the environment, with each user viewing the changes to the environment from his or her own point of view. Accordingly, with the described system, each user can step inside the EM spectrum and see the flow of EM photons as particles around the user.

Generating a particle visualization 115 may include identifying and then simulating antenna patterns. The antenna patterns may be depicted as RF photons moving in space within the particle visualization 115. Each antenna pattern may be illustrated uniquely within the virtual environment 110. Radio frequency signals for multiple different types of radios may be represented in the virtual environment 110 as EM particle emissions. Different symbols, colors, shapes, etc. may be used to show EM emissions from cellular towers, cell phones, WiFi routers, citizens band (CB) radios, drones, jammers, or other types of emitters.

Each emitter type may be identified, and the particle visualization generator 106 may determine how to best represent that emitter. In some cases, the particle visualization 115 may be generated from a stream of incoming data from the emitter. In these cases, generating the particle visualization 115 may include inferring how many particles are to be incorporated and which direction the particles are to be moving within the particle visualization. The particle visualization generator 106 takes into account the physics of a given scenario, and determines how each emitter would behave in that scenario, and how the EM radiations would travel within that environment.

Any of the users in the multi-user environment may interact with the virtual environment 110 using input 109 (740). The user input receiver 107 of computer system 101 may receive these inputs, and the visualization updating module 117 may update the particle visualization 115 based on the user's interaction with the virtual element (750). "Interaction" in this sense may be anything from simply viewing the visualization to changing the angle of viewing, selecting a certain element, zooming in or out, moving, adding or replacing an element, or moving physical elements in a mixed or augmented reality scenario.

In some embodiments, the particle visualization 115 may be generated from an exocentric frame of reference, in relation to the user. In such cases, the virtual environment is generated not from the user's point of view, but from another point of view external to the user. Accordingly, the user can observe the RF photon trajectories for various EM emitters, and can see RF photon interactions with the ground, with other aircraft, with weather, and with signals from other antenna. Thus, in this manner, the particle visualization generator 106 determines how signals will interfere with each other, how weather or other objects will interfere with the signals, and how other elements will affect the propagation of EM radiation within an environment. Alternatively, the particle visualization 115 may be generated from an egocentric frame of reference, in relation to the user. In such cases, the interactions between EM emissions and other elements will still be illustrated, but the frame of reference for the visualization will be based on the user's point of view.

If multiple users are viewing the particle visualization 115 simultaneously, the visualization may be generated from one of the user's point of view or from an exocentric point of view. Each user may interact with the visualization 115 simultaneously. The visualization updating module 117 may interpret these interactions, and may update the particle visualization 115 accordingly. The users may change how certain things are represented in the particle visualization based on settings or preferences. One setting may be to increase or decrease the amount of detail or the amount of realism.

For instance, if multiple emitters are present in the virtual environment 110, a user may be able to control how the particle visualization generator 106 is to account for different physical interactions between elements including diffraction, reflection or absorption or other types of interference. If multiple EM emitters are shown in the environment, it may require a large amount of computational power to calculate all of the physical interactions for all of the particles in the environment. Accordingly, users may be able to increase or decrease the level of physics realism for a given EM emitter or for the visualization as a whole, and may thereby control the amount of computational power being consumed for a given computational system. Thus, users may have a great deal of control over how the particle visualization is generated initially, and may further alter the visualization in real time using different types of interactions.

Accordingly, methods, systems and computer program products are provided which visualize electromagnetic (EM) particle emissions in a computer-generated virtual environment. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A method, implemented at a computer system that includes at least one processor, for visualizing virtual electromagnetic (EM) particle emissions in a computer-generated virtual environment, the method comprising:
   accessing one or more portions of data representing virtual EM particle emissions emitted by at least one virtualized EM particle emitter;
   generating a virtual particle visualization of at least a portion of the virtual EM particle emissions being emitted from the virtualized EM particle emitter within the virtual environment, the virtual particle visualization including an indication of the virtual EM particle emissions' interactions with other elements in the virtual environment; and
   presenting the generated virtual particle visualization in the computer-generated virtual environment.

2. The method of claim 1, wherein the computer-generated virtual environment comprises at least one of an augmented reality environment, a mixed reality environment or a virtual reality environment.

3. The method of claim 1, wherein the generated a virtual particle visualization is implanted in a heads up display (HUD).

4. The method of claim 1, wherein the generated virtual particle visualization is presented to a plurality of users, such that the plurality of users simultaneously experiences the virtual particle visualization, each user from their own perspective.

5. The method of claim 1, wherein the generated a virtual particle visualization includes a visible replication of a physical battlefield, as well as a visible replication of an invisible battlefield including virtual EM particle emissions from variously-placed EM particle generators.

6. The method of claim 1, wherein a plurality of virtual EM particle emissions are aggregated together into a group, and are presented in the virtual particle visualization as a group.

7. The method of claim 1, wherein the virtual environment comprises a virtual reality environment that allows users to step inside the EM spectrum and see the flow of EM photons as virtual particles around the user.

8. The method of claim 1, wherein RF signals for a plurality of different radio types are represented as virtual EM particle emissions in the virtual particle visualization.

9. The method of claim 8, wherein generating a virtual particle visualization comprises simulating antenna patterns, the antenna patterns being depicted as RF photons moving in space within the virtual particle visualization.

10. The method of claim 1, wherein the virtual particle visualization is generated from a stream of incoming data, and wherein generating the virtual particle visualization includes inferring how many virtual particles are to be incorporated and which direction the virtual particles are to be moving within the virtual particle visualization.

11. At least one computer-readable storage device that stores computer-executable instructions which, when executed, implement a method for visualizing virtual electromagnetic (EM) particle emissions in a computer-generated virtual environment, the method comprising:
   accessing one or more portions of data representing virtual EM particle emissions emitted by at least one virtualized EM particle emitter;
   generating virtual particle visualization of at least a portion of the virtual EM particle emissions being emitted from the virtualized EM particle emitter within the virtual environment, the virtual particle visualization including an indication of the virtual EM particle emissions' interactions with other elements in the virtual environment;
   presenting the generated virtual particle visualization in the computer-generated virtual environment;
   receiving user input intended to interact with at least one virtual element within the virtual environment; and
   updating the generated virtual particle visualization based on the user's interaction with the virtual element.

12. The computer-readable storage device of claim 11, wherein the virtual particle visualization is generated from an exocentric frame of reference, in relation to the user.

13. The computer-readable storage device of claim 11, wherein the virtual particle visualization is generated from an egocentric frame of reference, in relation to the user.

14. The computer-readable storage device of claim 11, wherein a plurality of users interact with the virtual particle visualization simultaneously, and wherein the virtual particle visualization is updated based on the plurality of users' interactions.

15. The computer-readable storage device of claim 11, wherein the virtual particle visualization is configured to account for a plurality of physics-based elements including at least one of diffraction, reflection or absorption at one or more levels of realism.

16. A computer system comprising the following:
   one or more processors;
   a data accessing module configured to access one or more portions of data representing EM particle emissions emitted by a plurality of virtual EM particle emitters in a virtualized anti-access/area denial (A2AD) environment;

a particle visualization generator configured to generate a particle visualization of a plurality of EM particle emissions being emitted from the virtual EM particle emitters in the virtual A2AD environment, the particle visualization including an indication of the EM particle emissions' interaction with other elements in the virtual A2AD environment;

a display for displaying the generated particle visualization in the computer-generated virtual environment;

an input receiver configured to receive user input intended to interact with at least one virtual element within the virtual A2AD environment; and a visualization updating module configured to update the generated particle visualization based on the user's interaction with the at least one virtual element.

17. The computer system of claim 16, wherein the particle visualization generator is further configured to provide additional functionality in the particle visualization including battlefield management, planning, flight test observation, playback and simulation in the virtual A2AD environment.

18. The computer system of claim 17, wherein the particle visualization generator is further configured to determine interference between aircraft, interference caused by geography, or interference caused by weather.

19. The computer system of claim 17, wherein the particle visualization generator instantiates one or more signal jammers within the virtual A2AD environment, and further presents a mapped out flight course through the virtual A2AD environment that avoids the signal jammers.

20. The computer system of claim 19, wherein the particle visualization generator determines how many particles are emitted by each signal jammer, and which flight course results in a minimal amount of particles coming into contact with an aircraft.

* * * * *